(12) United States Patent
Morishita et al.

(10) Patent No.: US 7,926,055 B2
(45) Date of Patent: Apr. 12, 2011

(54) PROCESSOR CAPABLE OF RECONFIGURING A LOGICAL CIRCUIT

(75) Inventors: Hiroyuki Morishita, Osaka (JP); Takashi Hashimoto, Hyogo (JP); Tokuzo Kiyohara, Osaka (JP)

(73) Assignee: Panasonic Corporation, Osaka (JP)

( * ) Notice: Subject to any disclaimer, the term of this patent is extended or adjusted under 35 U.S.C. 154(b) by 326 days.

(21) Appl. No.: 11/574,359

(22) PCT Filed: Apr. 12, 2006

(86) PCT No.: PCT/JP2006/307775
§ 371 (c)(1),
(2), (4) Date: Sep. 29, 2008

(87) PCT Pub. No.: WO2006/109835
PCT Pub. Date: Oct. 19, 2006

(65) Prior Publication Data
US 2009/0037916 A1    Feb. 5, 2009

(30) Foreign Application Priority Data

Apr. 12, 2005  (JP) .................................. 2005-114133
Oct. 25, 2005  (JP) .................................. 2005-309352

(51) Int. Cl.
*G06F 9/46* (2006.01)

(52) U.S. Cl. ........................................ 718/100; 718/102

(58) Field of Classification Search .................... 718/102
See application file for complete search history.

(56) References Cited

U.S. PATENT DOCUMENTS

| | | | |
|---|---|---|---|
| 6,567,840 B1 | 5/2003 | Binns et al. | |
| 7,308,571 B2 * | 12/2007 | Barragy et al. | 713/100 |
| 7,716,668 B2 * | 5/2010 | Moore et al. | 718/104 |
| 2003/0184339 A1 | 10/2003 | Ikeda et al. | |
| 2004/0006584 A1 * | 1/2004 | Vandeweerd | 709/107 |
| 2004/0019765 A1 * | 1/2004 | Klein, Jr. | 712/15 |

FOREIGN PATENT DOCUMENTS

| | | |
|---|---|---|
| JP | 2002-544621 | 12/2002 |
| WO | WO 02/095946 | 11/2002 |

OTHER PUBLICATIONS

Masahiro Iida et al., "Reconfigurable System Using Multithread Control Library Implemented as Hardware", Technical Report of IEICE, vol. 96, No. 426, Dec. 13, 1996, 12 pages, with verification of translation.

Compton, et al. "Reconfigurable Computing: A Survey of Systems and Software"; ACM Computing Surveys, vol. 34, No. 2, Jun. 2002, pp. 171-210.

(Continued)

*Primary Examiner* — Emerson C Puente
*Assistant Examiner* — Gregory A Kessler

(57) ABSTRACT

The present invention provides a processor that cyclically executes a plurality of threads in accordance with an execution time allocated to each of the threads, comprising a reconfigurable integrated circuit. The processor stores circuit configuration information sets respectively corresponding to the plurality of threads, reconfigures a part of the integrated circuit based on the circuit configuration information sets, and sequentially executes each thread using the integrated circuit that has been reconfigured based on one of the configuration information sets that corresponds to the thread. While executing a given thread, the processor selects a thread to be executed next, and reconfigures a part of the integrated circuit where is not currently used for execution of the given thread, based on a circuit configuration information set corresponding to the selected thread.

8 Claims, 12 Drawing Sheets

OTHER PUBLICATIONS

Okada, Makoto et al.; A Reconfigurable Processor Based on ALU Array Architecture with Limitation on the Interconnection; Proceedings of the 19th IEEE International Parallel and Distributed Processing Symposium (IPDPS'05); Apr. 8, 2005; pp. 1-5 (p. 6 info only).

Iida, Masahiro et al.; Reconfigurable System Using Multithread Control Library Implemented as Hardware; The Institute of Electronics Information and Communication Engineers; Technical Report of IEICE vol. 96-82, Dec. 1996; pp. 135-142; with English Abstract.

* cited by examiner

| OPERATION CODE TYPE 5411 | ADDRESS 5412 | REQUIRED AREAS (TOTAL: 4) 5413 |
|---|---|---|
| Sub | addr1 | 3 |
| Mul | addr2 | 4 |
| Dev | addr3 | 4 |
| Reconf0 | addr4 | 1 |
| Reconf1 | addr5 | 2 |

5410

| 5111 | 5112 |
|---|---|
| Add | r0, r1, r2 |
| Sub | r3, r1, r3 |
| Reconf0 | r2, r0, 0xfe |
| Reconf1 | r3, r1, r3 |

FIG. 11

5111            5112
         ↓               ↓
Sub      r3, r1, r3
Add      r0, r1, r2
Reconf0  r2, r0, 0xfe         Reconf1    r3, r1, r3

PROCESSOR CAPABLE OF RECONFIGURING A LOGICAL CIRCUIT

TECHNICAL FIELD

The present invention relates to a processor, especially to a processor having a reconfigurable integrated circuit.

BACKGROUND ART

Processors of recent years, for example, processors mounted on audio and video apparatuses using digital signals are required to perform a plurality of processes.

For example, as a method for compressing a video, many standards such as MPEG (Moving Picture Experts Group) 2, MPEG4, H.263 and H.264 have been put into practical use.

Therefore, in view of users' convenience, audio and video apparatuses today are demanded to realize a plurality of functions, e.g., by supporting the plurality of standards above.

There are two ways for meeting this demand. One is to mount plural pieces of hardware each performing a single process, to have them perform a plurality of processes. The other is to mount a single piece of hardware and have software perform a plurality of processes.

The former way has an advantage that high performance can be realized. However, if there are many functions to be realized, the circuit size becomes large, and this is a disadvantage. Moreover, in the case of adding a new function for example, it is necessary to add a new piece of hardware.

On the other hand, the latter way has an advantage that it is possible to flexibly realize a plurality of functions and add a new function by changing and adding software for example. A disadvantage is that it is difficult to improve the performance.

Given these factors, a conventional art (see Patent Document 1) suggests reconfigurable hardware in that a circuit suitable for a particular process is incorporated as a part of a homogeneous circuit structure, and capable of realizing flexible and high-quality performance on the particular processes by dynamically reconfiguring the hardware structure.
Patent Document 1: International Publication No. 2002/095946 Pamphlet

DISCLOSURE OF THE INVENTION

Problems to be Solved by the Invention

However, such reconfigurable hardware requires wiring parts and switches as well as the portion where the circuit functions are implemented. Accordingly, it is inevitable that the circuit size becomes large, and it takes a lot of time to reconfigure the hardware.

To solve this problem, the present invention aims to provide a flexible and high-performance processor while reducing the circuit size.

Means for Solving the Problem

To solve the above-described problem, the present invention provides a processor that cyclically executes a plurality of threads in accordance with an execution time allocated to each of the threads, comprising: a reconfigurable integrated circuit; a reconfiguration unit operable to reconfigure a part of the integrated circuit based on a circuit configuration information set; a configuration information storing unit that stores therein circuit configuration information sets corresponding one-to-one to the threads; a control unit operable to put each thread into execution using the integrated circuit that has been reconfigured based on one of the configuration information sets that corresponds to the thread; and a selection unit operable, while a given thread put into execution by the control unit is being executed, to select a thread to be executed next.

ADVANTAGEOUS EFFECTS OF THE PRESENT INVENTION

With the stated structure, the processor according to the present invention can reconfigure the circuit for each thread. Therefore, it becomes possible to execute the thread using a circuit suitable for the thread.

While the given thread is being executed, the control unit may have the reconfiguration unit reconfigure a part of the integrated circuit where is not currently used for execution of the given thread, based on a circuit configuration information set corresponding to the thread selected by the selection unit.

With the stated structure, the processor according to the present invention can perform reconfiguration of the next thread while the previous thread is being executed. Therefore, the reconfiguration does not require time, and it becomes possible to realize a flexible and high-performance processor.

The processor may further comprise a computing unit, wherein the control unit may put the given thread into execution using the computing unit and the integrated circuit that has been reconfigured.

With the stated structure, it is possible to execute a thread using are configured integrated circuit. Accordingly, it is possible to use a normal computing unit, or a reconfigured computing unit, or the both of them. Therefore, it is possible to realize a flexible and high-performance processing while reducing the circuit size. For example, the reconfigured integrated circuit may be used as a computing unit for particular processing.

In other words, it is not necessary to reconfigure the integrated circuit for all the processing. Therefore, it is possible to reduce the size of the reconfigurable circuit, and thereby reduce the size of the whole processor. In addition, it is possible to realize flexible and high-performance processing, because the circuit required for the processing is reconfigurable.

The present invention also provides a processor that executes a program including a plurality of instructions, comprising: a reconfigurable integrated circuit; a reconfiguration unit operable to reconfigure a part of the integrated circuit based on a circuit configuration information set; a configuration information storing unit that stores therein circuit configuration information sets corresponding one-to-one to the instructions; a selection unit operable to select two or more instructions for all of which the integrated circuit is reconfigurable at the same time based on the circuit configuration information sets; and an execution unit operable to execute the two or more instructions in parallel using the integrated circuit that has been reconfigured based on configuration information sets respectively corresponding to the two or more instructions.

With the stated structure, the processor according to the present invention can reconfigure the integrated circuit for each instruction. Since it is possible to perform reconfiguration for a plurality of instructions at the same time in accordance with the circuit size and so on, it is possible to realize flexible and high-performance processing while reducing the circuit size. To perform reconfiguration at the same time, it is necessary to consider the execution order of the instructions. In addition, it is necessary that the total size of a circuit required for one instruction and a circuit required for another instruction is not larger than the circuit size of the configurable logical circuit.

BRIEF DESCRIPTION OF THE DRAWINGS

FIG. 11 is an example program using instruction sets of a modification;

EXPLANATION OF REFERENCES 1000 5000 processor
1100 multithread processor
1110 thread scheduling unit
1120 fixed-function computing unit
1200 reconfigurable computing unit
1300 configuration information storing unit
1400 reconfiguration control unit
1410 1420 thread information table
5010 instruction storing unit
5100 instruction fetch unit
5110 5150 instruction code
5111 operation code
5112 operand
5200 instruction decoding unit
5300 computation control unit
5400 address table storing unit
5410 instruction information table
5413 number of required areas
5500 reconfiguration information storing unit
5600 reconfigurable computing unit
5700 fixed-function computing unit

BEST MODE FOR CARRYING OUT THE INVENTION

First Embodiment

<Overview>

A processor according to the present invention includes reconfigurable hardware in addition to a computing unit for normal processors so that processes are performed in sharing, the circuit size is reduced and high-performance processing is realized.

In other words, if there is a plurality of processes, they are not all different. Some of processes and instructions are the same, and some are frequently used. From this viewpoint, the processor according to the present invention has a normal computing unit execute the same processes, and has a computing unit structured with reconfigurable hardware execute particular processes, in order to reduce the circuit size of the processor as a whole and maintain the high performance.

In this embodiment, the processor is a multithread processor. To realize multithreading, the processor uses a round-robin method of sequentially performing tasks, taking a predetermined period for each.

Regarding each thread, processes to be preferably performed a unique circuit and processes requiring a unique circuit are performed by a circuit structured by reconfiguring the reconfigurable hardware.

In other words, with the processor according to the present invention, it is unnecessary to provide a unique circuit for each of the threads. As a result, it is possible to reduce the circuit size as whole.

However, the reconfiguration requires a certain amount of time. Therefore, the point is to reduce the time required for the reconfiguration.

The following describes the multithread processor according to the embodiments of the present invention.

<Structure>

Figure 1:
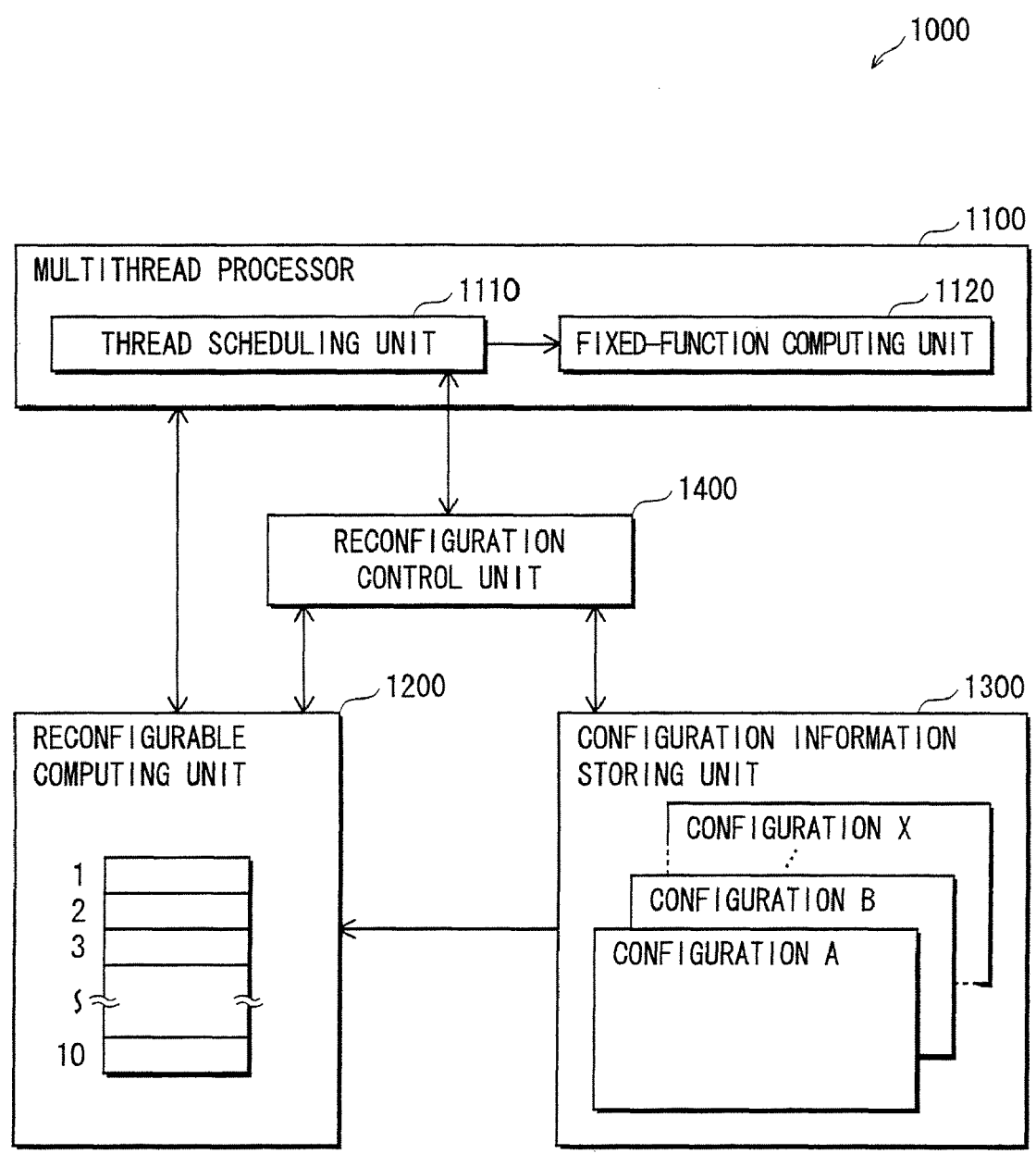
FIG. 1 shows an example structure of a processor 1000.

The following describes a processor 1000 according to the present invention, with reference to FIG. 1.

FIG. 1 shows an example structure of the processor 1000.

The processor 1000 includes a multithread processor 1100, a reconfigurable computing unit 1200, a configuration information storing unit 1300 and a reconfiguration control unit 1400.

The multithread processor 1100 is a normal processor capable of executing a plurality of different processes in time sharing. Such a processor is so called a multithread processor.

The multithread processor 1100 includes a fixed-function computing unit 1120 as a normal computing unit, and a thread scheduling unit 1110. The thread scheduling unit 1110 has functions of scheduling the threads. For example, the thread scheduling unit 1110 determines a thread to be executed the next.

The thread scheduling unit 1110 also perform operations specific to the present invention in addition to determining a thread to be executed next to prepare for saving/restoring a register.

Specifically, for example, the thread scheduling unit selects a thread to be executed next while another thread is being executed, and notifies the reconfiguration control unit 1400 of the selected thread.

The multithread processor 1100 executes processes while transmitting and receiving computation data to and from both the fixed-function computing unit 1120 inside the multithread processor 1100 and the reconfigurable computing unit 1200 according to need.

Next, the reconfigurable computing unit 1200 includes logical blocks that can realize combinational circuits and sequential circuits, and wiring parts between the logical blocks. The logical block is a circuit unit including a look-up table and a flip-flop. A desired logical circuit is realized by changing setting values of the look-up table. The wiring part includes a transistor switch and so on, and the wiring pattern can be set flexibly.

In this embodiment, all the logical blocks have the same structure, and the functions thereof can be changed independently. Circuits having various functions can be realized by connecting the logical blocks together by the wiring parts that can be differently combined.

In this embodiment, it is also assumed that the reconfigurable computing unit 1200 is divided into ten areas having the same structure. These areas are independently reconfigurable. Each area is connected with a wiring part that can be differently combined with another wiring part, and a single circuit is realized with a plurality of areas.

The configuration information storing unit 1300 has a function of storing configuration information set for reconfiguring the reconfigurable computing unit 1200 to be a desired circuit. The configuration information set is prepared for each of desired circuits.

The configuration information set includes setting values of the look-up table for the logical block and information of control signals to be input to each of transistor switches for configuring the wiring pattern.

The configuration information storing unit 1300 also has a function of storing a thread information table 1410 which is described later, in addition to the configuration information sets. This table associates a thread with a configuration information set to be used in the thread.

During execution of a thread, the reconfiguration control unit 1400 receives a notification of the next thread from the thread scheduling unit 1110, and judges whether the thread is executable by the fixed-function computing unit 1120 alone, or requires the reconfigurable computing unit 1200. If it is required to reconfigure the reconfigurable computing unit 1200, the configuration control unit 1400 gives instructions to the reconfigurable computing unit 1200 and the configuration information storing unit 1300.

The reconfiguration control unit 1400 notifies the reconfigurable computing unit 1200 of reconfiguration and areas to be reconfigured, and instructs the configuration information storing unit 1300 to specify the corresponding configuration information and to provide the configuration information to the reconfigurable computing unit 1200.

In the case where it is impossible to perform the reconfiguration, the reconfiguration control unit 1400 notifies the thread scheduling unit 1110 accordingly. Here, the case where it is impossible to perform the reconfiguration is when there is no reconfigurable area in the reconfigurable computing unit 1200.

<Operations>

Figure 2:
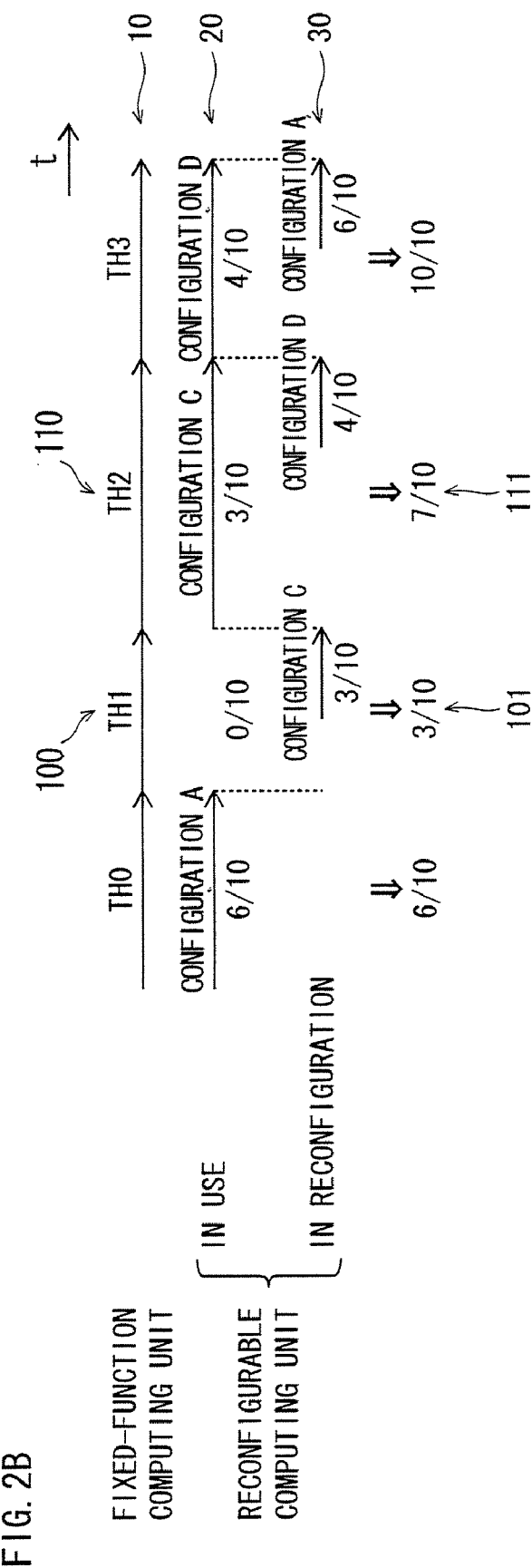
FIG. 2A shows an example structure and example contents of a thread information table 1410.
FIG. 2B is a time chart showing an example of execution of threads.

Next, the operations performed by the processor according to the present invention are described with reference to FIG. 2 to FIG. 4.

An example case where threads are executed in order is explained with reference to FIG. 2, and an example case where the execution order of threads is changed is explained with reference to FIG. 3.

<Execution of Threads in Order>

FIG. 2A shows an example structure and example contents of the thread information table 1410. FIG. 2B is a time chart showing an example of execution of the threads.

The time chart of FIG. 2B shows the case where the threads relating to the thread information table 1410 of FIG. 2A are executed.

Firstly, the following is the explanation of the thread information table 1410 of FIG. 2A.

This thread information table 1410 is stored in the configuration information storing unit 1300.

The thread information table 1410 includes groups of a thread name 1411, a configuration information set 1412, and the number of required areas 1413.

The thread name 1411 is an identifier of a thread. In the following explanation, it is assumed that four threads, namely "TH0" to "TH3", are executed in this order.

The configuration information set 1412 is information for reconfiguring the reconfigurable computing unit 1200 when the thread represented by the thread name 1411 is to be executed by the reconfigurable computing unit 1200.

The number of required areas 1413 represents the number of areas required for using the reconfigurable computing unit 1200.

For example, the thread whose thread name 1411 is "TH0" uses the reconfigurable computing unit 1200 that has been reconfigured to have the configuration specified by the configuration information set 1412 that indicates "Configuration A". To reconfigure the computing unit 1200 in accordance with the "Configuration A", "6" areas are required as the number of required areas 1413 indicates. The sign "−", which is indicated by the configuration information set 1412 that corresponds to the thread whose thread name 1411 is "TH1", represents that the reconfigurable computing unit 1200 is not to be used. Naturally, the number of required areas 1413 is "0" in this case.

Next, an example of execution of threads is explained with reference to FIG. 2B. FIG. 2B illustrates a time chart 10, a time chart 20 and a time chart 30. The time chart 10 shows that the threads use the fixed-function computing unit 1120. The time chart 20 shows the configuration information sets in the case that the threads use the reconfigurable computing unit 1200. The time chart 30 shows the configuration information sets in the case that the reconfigurable computing unit 1200 is reconfigured while the threads are executed. In FIG. 2B, the configuration information set is shown above each arrow, and the number of areas required according to the configuration information set is shown below the arrow. Although FIG. 2B illustrates a case where all the threads use the fixed-function computing unit 1120, it is possible that they do not use the fixed-function computing unit 1120 for a while.

It is assumed that threads "TH0", "TH1", "TH2" and "TH3" are executed in this order, and while each thread is executed, the reconfigurable computing unit 1200 is reconfigured for the next thread.

By making preparations in this way, it becomes unnecessary to take time for reconfiguration. As a result, time for executing the threads is only required.

For example, the thread 100 having the thread name "TH1" uses only the fixed-function computing unit 1120.

In this period, the reconfigurable computing unit 1200 is reconfigured based on the configuration information set 1412 named "Configuration C" to be used by the next thread 110 whose thread name 1411 is "TH2".

In this case, the reconfigurable computing unit 1200 has 10 areas in total. Therefore, the number of areas to be used in the reconfigurable computing unit 1200 is 3/10 (three out of ten) areas that are required for the "Configuration C", as indicated by a reference number 101.

In the same manner, the thread 110 having the thread name "TH2" is executed using the fixed-function computing unit 1120 and the reconfigurable computing unit 1200 reconfigured based on "Configuration C".

In this period, the reconfigurable computing unit 1200 is reconfigured based on the configuration information set 1412 named "Configuration D" to be used by the next thread whose thread name 1411 is "TH3".

In this case, the number of areas to be used in the reconfigurable computing unit 1200 is 7/10 (seven out of ten) areas as indicated by a reference number 111, which is the total of 3/10 (three out of ten) areas currently used for the "Configuration C" and 4/10 (four out of ten) areas required for the "Configuration D".

In this way, reconfiguration required for a thread is performed before the thread is executed.

<Execution of Threads in Changed Order>

Figure 3:
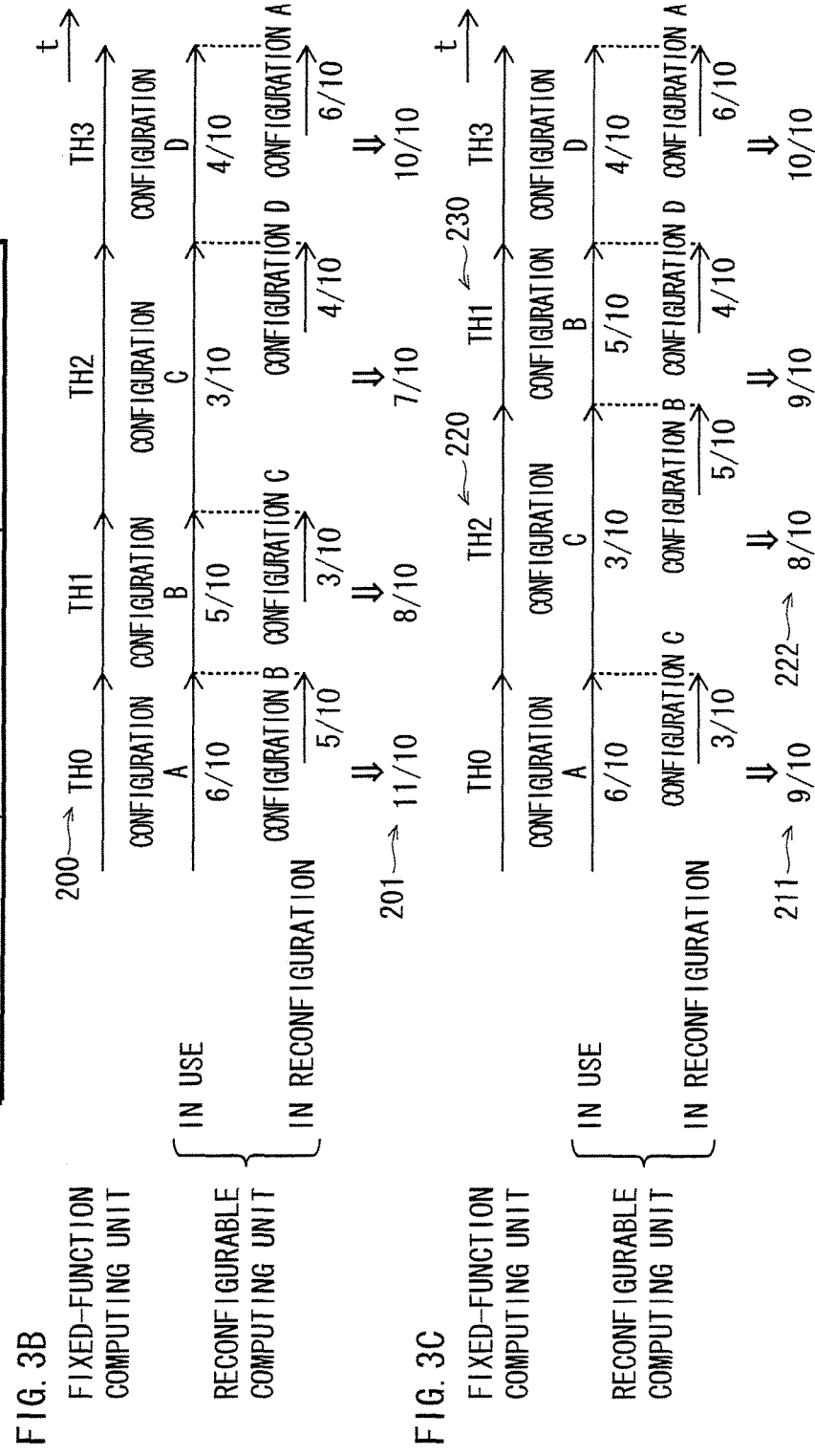
FIG. 3A shows an example structure and example contents of a thread information table 1420.
FIG. 3B and FIG. 3C are time charts respectively showing examples of execution of threads.

The next explains the case of changing the execution order of thread so that the reconfiguration for the next thread can be performed while another thread is being executed, with reference to FIG. 3.

FIG. 3A shows an example structure and example contents of the thread information table 1420. FIG. 3B and FIG. 3C are time charts respectively showing examples of execution of the threads.

The time charts of FIG. 3B and FIG. 3C show the cases where the threads relating to the thread information table 1420 of FIG. 3A are executed.

Firstly, the following is the explanation of the thread information table 1420 of FIG. 3A.

Since the thread information table 1420 of FIG. 3A is almost the same as the thread information table 1410 of FIG. 2A, only the difference is described next.

The difference is that the thread 1421 whose thread name 1411 "TH1" uses the reconfigurable computing unit 1200. The configuration information set 1412 indicates "Configuration B" and the number of the required areas 1413 is "5".

Next, a time chart showing an example of execution of threads is described next with reference to FIG. 3B. What the time chart means is the same as in FIG. 2B.

In FIG. 3B, a thread 200 whose thread name is "TH0" is being executed using the fixed-function computing unit and the reconfigurable computing unit configured based on "Configuration A".

In this period, the reconfiguration control unit 1400 attempts to reconfigure the reconfigurable computing unit 1200 based on the configuration information set 1412 that indicates "Configuration B" to be used by the next thread 1411 whose thread name is "TH1".

In this case, the number of required areas of the reconfigurable computing unit 1200 is 11/10 (eleven out of ten) areas as indicated by a reference number 201, which is the total of 6/10 (six out of ten) areas currently used for the "Configuration A" and 5/10 (five out of ten) areas required for the "Configuration B". This means that it is impossible to reconfigure the reconfigurable computing unit 1200 based on "Configuration B" while the thread "TH0" is being executed.

Accordingly, the thread 220 whose thread name is "TH2" is executed before the thread 230 whose thread name is "TH1" is executed. In other words, the execution order of the threads is changed.

Consequently, while the thread "TH0" is being executed, the reconfigurable computing unit 1200 is reconfigured based on "Configuration C", which is to be used by the thread 220 whose thread name is "TH2". The number of areas to be used in the reconfigurable computing unit 1200 is 9/10 (nine out of ten) areas as indicated by a reference number 211, which is the total of 6/10 (six out of ten) areas currently used for the "Configuration A" and 3/10 (three out of ten) areas required for the "Configuration C". This means that it is possible to previously perform the reconfiguration.

In the same manner, while the thread 220 whose thread name is "TH2" is executed using the fixed-function computing unit 1120 and the reconfigurable computing unit 1200 reconfigured based on "Configuration C", the reconfigurable computing unit 1200 is reconfigured based on the configuration information set 1412 that indicates "Configuration B" to be used by the next thread 1411 whose thread name is "TH1".

In this case, the number of the areas to be used in the reconfigurable computing unit 1200 is 8/10 (eight out of ten) areas as indicated by a reference number 222, which is the total of 3/10 (three out of ten) areas currently used for the "Configuration C" and 5/10 (five out of ten) areas required for the "Configuration B".

Generally, in the round-robin method, the length of the time slice to be assigned to each thread is determined based on the process to be executed in the threads. In other words, for example, to ensure that a process is completed, the process is assigned to a thread whose time slice is long.

Therefore, a precondition for assigning a process to the thread is not to disturb the cycle.

However, the length of single time slice is very short compared to the time of the whole process. Therefore, in the processor according to the present invention, the thread scheduling unit 1110 performs adjustment so that the execution time of each thread is within a predetermined time as scheduled. For example, ten executions of all the threads are grouped, and the number of times each thread is executed is counted. Before the eleventh execution of the first thread, another thread that has not been executed 10 times, if any, is executed by priority. After all the threads are executed 10 times, the eleventh execution of the first thread is started.

<Thread Control>

Next, the thread control of the processor of the present invention is described with reference to FIG. 4.

Figure 4:
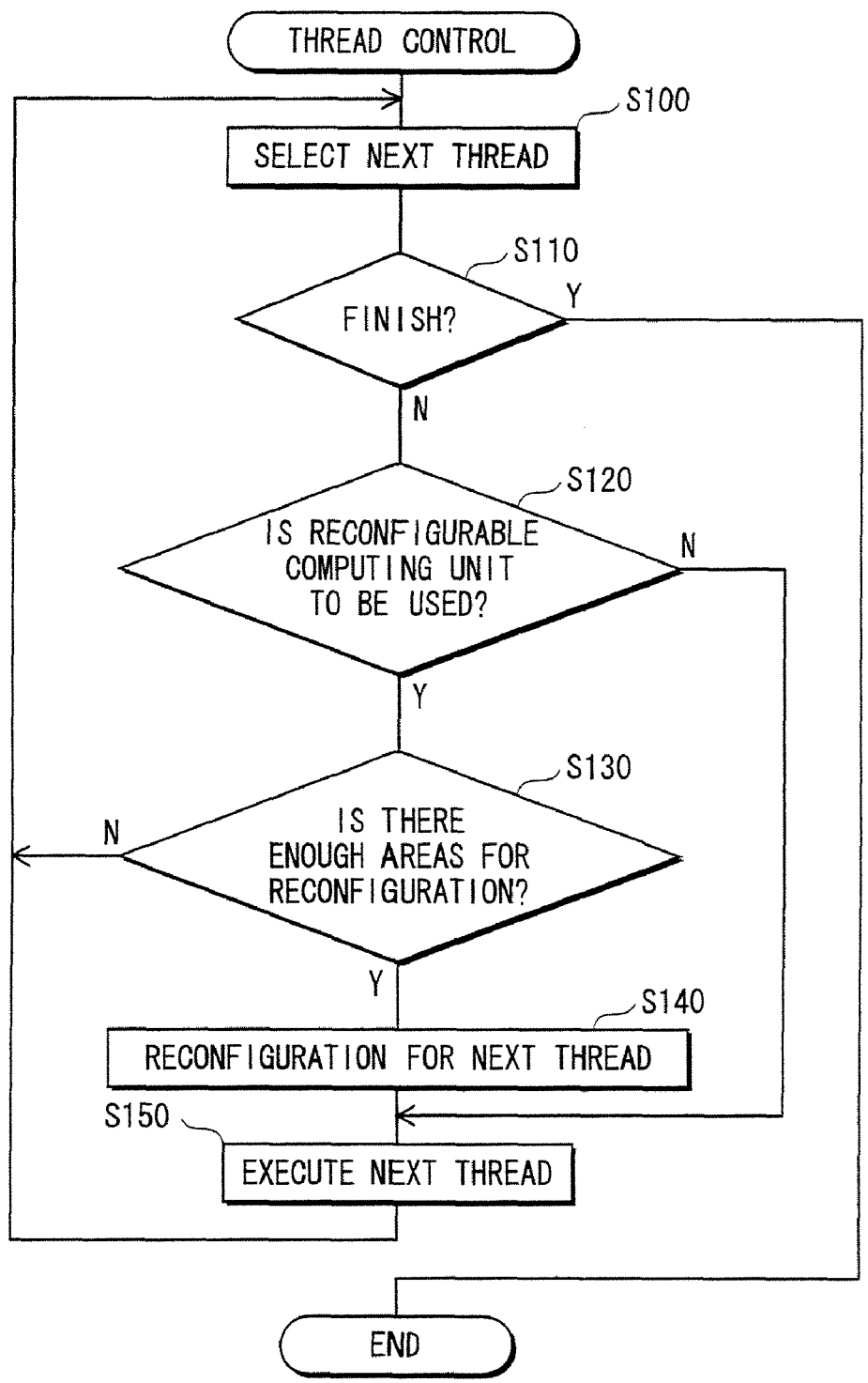
FIG. 4 is a flowchart showing thread control of the processor of the present invention.

FIG. 4 is a flowchart showing the thread control of the processor of the present invention.

The thread scheduling unit 1110 selects a thread to be executed next (Step S100). If it is just after the control is started, the first thread is executed.

If all the processes are completed (Step S110: Y), the thread schedule unit 1110 finishes the thread control.

When the next thread which has been selected is to be executed, the thread schedule unit 1110 gives the thread name 1411 of the thread to the reconfiguration control unit 1400 to make a request for reconfiguration.

Upon receiving the request, the reconfiguration control unit 1400 judges whether the thread having the received thread name 1411 uses the reconfigurable computing unit 1200 with reference to the thread information table 1410 stored in the configuration information storing unit 1300. Specifically, if a configuration is designated by the configuration information set 1412 corresponding to the received thread name 1411, the reconfiguration control unit 1400 judges that the thread uses the reconfigurable computing unit 1200.

If judging negatively (Step S120: N), the reconfiguration control unit 1400 notifies the thread scheduling unit 1110 accordingly. Then, the thread scheduling unit 1110 starts execution of the next thread immediately after the currently executed thread is completed (Step S150).

On the other hand, if judging affirmatively (Step S120: Y), the reconfiguration control unit 1400 judges whether there are enough empty areas for performing the reconfiguration (Step S130). Specifically, the reconfiguration control unit 1400 judges whether the required number of areas, indicated by the number of required areas 1413 corresponding to the received thread name 1411, is empty or not.

It is assumed that reconfiguration control unit 1400 stores therein identification numbers of currently used areas. When the time slice of a used area is finished, the reconfiguration control unit 1400 deletes the corresponding identification number as the area has become empty.

If judging that there are not enough empty areas (Step S130: N), the reconfiguration control unit 1400 notifies the thread scheduling unit 1110 accordingly. The thread scheduling unit 1110 selects another thread (Step S100). The thread scheduling unit 1110 stores the number of executions of each thread, and selects a thread to be executed in priority, if any, to average the numbers of executions of all the threads.

If judging that there are enough empty areas (Step S130: Y), the reconfiguration control unit 1400 notifies the reconfigurable computing unit 1200 of that the reconfiguration is to be performed, and instructs the configuration information storing unit 1300 to transmit the configuration information set 1412 corresponding to the received thread name 1411 with specifying an area. After the transmission, the reconfiguration control unit 1400 updates the identification numbers of the currently used areas stored therein.

The reconfigurable computing unit 1200 performs reconfiguration based on the configuration information set received from the configuration information storing unit 1300 (Step S140), and when the reconfiguration is completed, the reconfigurable computing unit 1200 notifies the reconfiguration control unit 1400 accordingly.

Upon receiving the notification, the reconfiguration control unit 1400 notifies the thread scheduling unit 1110 of the reception. Then, the thread scheduling unit 1110 starts the execution of the next thread immediately after finishing the current thread (Step S150).

Upon starting the thread, the thread scheduling unit 1110 selects the next thread (Step S100).

Second Embodiment

<Overview>

In the first embodiment, assignment to the reconfigurable computing unit is performed in units of threads. On the other hand, in the second embodiment, the assignment to the reconfigurable computing unit is performed in units of instruction codes.

The following describes the structure and so on relating to the second embodiment of the present invention.

<Structure>

Figure 5:
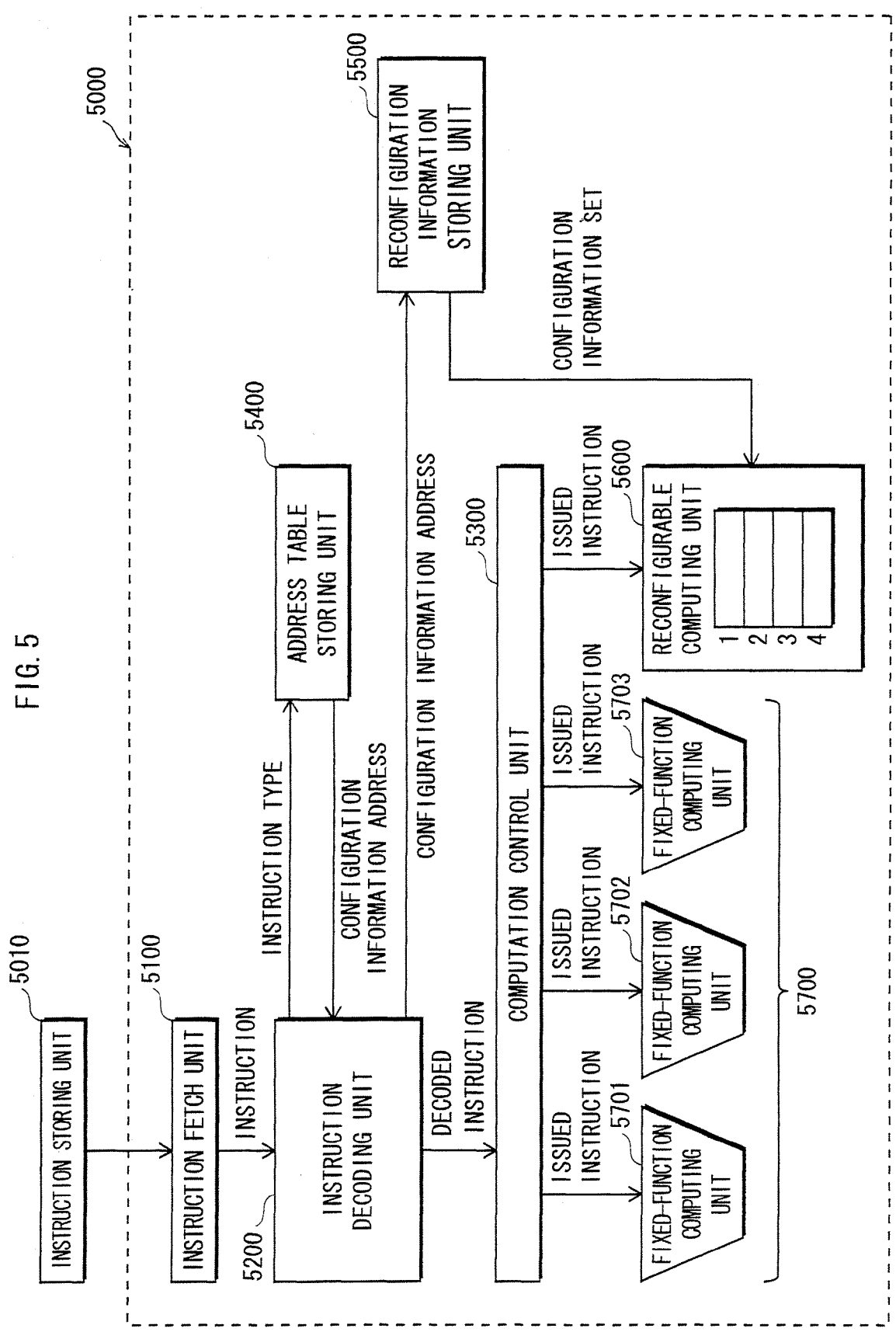
FIG. 5 shows an example structure of a processor 5000 according to the second embodiment.

FIG. 5 shows an example structure of a processor 5000 according to the second embodiment of the present invention.

The processor 5000 includes an instruction fetch unit 5100, an instruction decoding unit 5200, a computation control unit 5300, an address table storing unit 5400, a reconfiguration information storing unit 5500, a reconfigurable computing unit 5600, and a fixed-function computing unit 5700, and an instruction storing unit 5010 is provided outside the processor 5000.

The instruction storing unit 5010 has a function of storing instruction codes to be executed by the processor 5000.

The instruction fetch unit 100 has a function of reading an instruction coded from the instruction storing unit 5010, and giving the instruction code to the instruction decoding unit 5200.

The instruction decoding unit 5200 has a function that is unique to the present invention, in addition to a usual function of receiving an instruction code from the instruction fetch unit 5100 and decoding the instruction code.

Specifically, if a decoded instruction code is to use the reconfigurable computing unit 5600, the instruction decoding unit 5200 acquires an address of the configuration information set based on an instruction type from the address table storing unit 5400. Then, the instruction decoding unit 5200 gives the acquired address to the reconfiguration information storing unit 5500 and instructs the reconfiguration information storing unit 5500 to transmit the configuration information set to the reconfigurable computing unit 5600.

The address table storing unit 5400 has a function of storing instruction types and addresses of configuration information sets in one-to-one association.

The computation control unit 5300 has a function of controlling computing operations in accordance with results of the decoding performed by the instruction decoding unit 5200. The computation control unit 5300 gives instructions to the fixed-function computing unit 5700 and the reconfigurable computing unit 5600 with adjusting timing.

The reconfiguration information storing unit 5500 stores configuration information sets respectively corresponding to a plurality of instructions. The initial addresses of the configuration information sets are stored in the address table storing unit 5400 in one-to-one association with the instruction types. These configuration information sets have the same structures as the configuration information sets stored in the configuration information storing unit 1300 of the first embodiment.

The reconfiguration information storing unit 5500 also has a function of transmitting the configuration information set at the specified address to the reconfigurable computing unit 5600 in accordance with an instruction from the instruction decoding unit 5200.

The reconfigurable computing unit 5600 is a computing unit that is reconfigurable, and has a structure similar to the reconfigurable computing unit 1200 of the first embodiment. However, the reconfigurable computing unit 5600 has four areas.

The fixed-function computing unit 5700 includes a plurality of fixed-function computing units. In this embodiment, three fixed-function computing units (5701, 5702 and 5703) are included.

The following briefly explains the correspondence between the instructions and the configuration information sets, and also explains the operations.

<Correspondence between Instructions and Configuration Information Sets>

Figures 6, 7, 8:
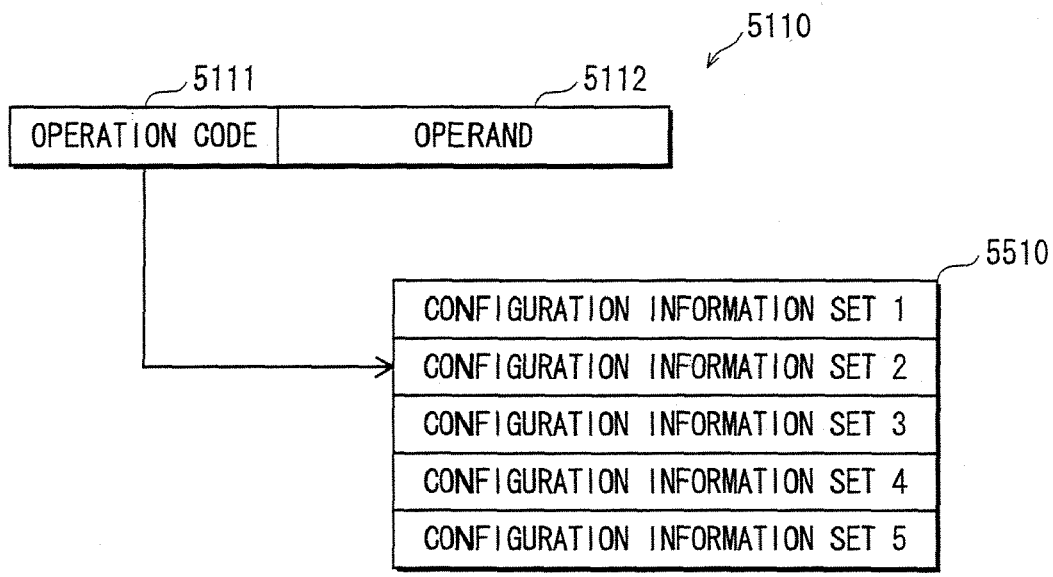
FIG. 6 shows an example structure of an instruction code used in the second embodiment.
FIG. 7 shows an example structure and contents of an instruction information table 5410.
FIG. 8 is an example program using instruction sets according to the second embodiment.

The following explains how to obtain, from the instruction code of the present invention, the configuration information set to be used for performing reconfiguration required for executing the instruction code, with reference to FIG. 6 and FIG. 7.

FIG. 6 shows an example structure of an instruction code used in the present invention. FIG. 7 shows an example structure and contents of an instruction information table 5410.

Firstly, the example structure of the instruction code of FIG. 6 is explained.

An instruction code 5110 used in the present invention includes an operation code 5111 showing a type of the instruction, and an operand 5112 showing values used for the instruction and so on.

In the present invention, the operation code 5111 is associated with a configuration information set (as indicated by an arrow in FIG. 6). If the processor judges that the instruction requires the reconfigurable computing unit 5600 to be executed, the instruction is executed by the reconfigurable computing unit 5600 reconfigured based on the configuration information set associated with the instruction.

If the processor judges that the instruction does not require there configurable computing unit 5600 to be executed, the instruction is executed by the fixed-function computing unit 5700.

Next, the instruction information table 5410 of FIG. 7 is explained.

It is assumed that the instruction information table 5410 is stored in the address table storing unit 5400.

The instruction information table 5410 is structured with an operation code type 5411, an address 5412 and the number of required areas 5413.

The operation code type 5411 represents an operation code of an instruction code, and identifying an instruction. It is assumed in this embodiment that only instructions using the reconfigurable computing unit 5600 are identified by the operation code type 5411.

Accordingly, instructions not identified by the operation code type 5411 are to be executed by the fixed-function computing unit 5700.

The address 5412 represents the address in the reconfiguration information storing unit 5500, of the configuration information set associated with the operation code indicated by the operation code type 5411. Although addresses are used in this embodiment, any information that can specify the reconfiguration information set, such as IDs, may be used.

The number of required areas 5413 represents the number of areas required when the reconfigurable computing unit 5600 is used. For example, an instruction whose operation code type 5411 is "Sub" uses the reconfigurable computing unit 5600 reconfigured based on the configuration information set stored at the address indicated by the address 5412 that indicates "addr1", and "3" areas are required for reconfiguring the reconfigurable computing unit 5600 as indicated by the number of required areas 5413.

In this embodiment, it is assumed that the order of the instructions and the identification numbers of areas to be reconfigured for the instructions are determined at the time of compiling of the program into machine language, namely the instruction codes 5110 of this embodiment, in view of the number of the areas to be used by the instruction in the reconfigurable computing unit 5600. In other words, at the time of the compiling, the order of the instructions is modified so that reconfiguration for one instruction is performed while another instruction is being executed, and areas to be reconfigured are determined. It is also assumed that the identification numbers of areas to be used are specified by the operands, or determined in one-to-one correspondence with the instructions or the like, so that the identification numbers of areas to be used are known by the instruction decoding unit.

<Operations>

Figure 9:
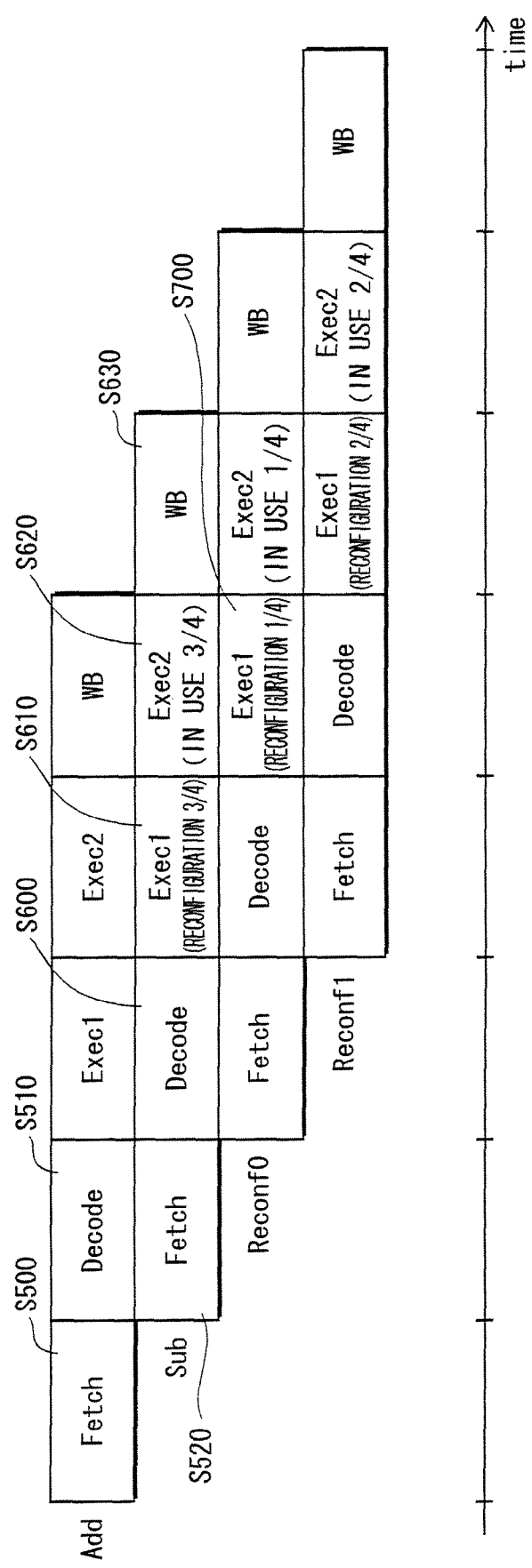
FIG. 9 is an example of pipeline processing for executing a program.
Figure 10:
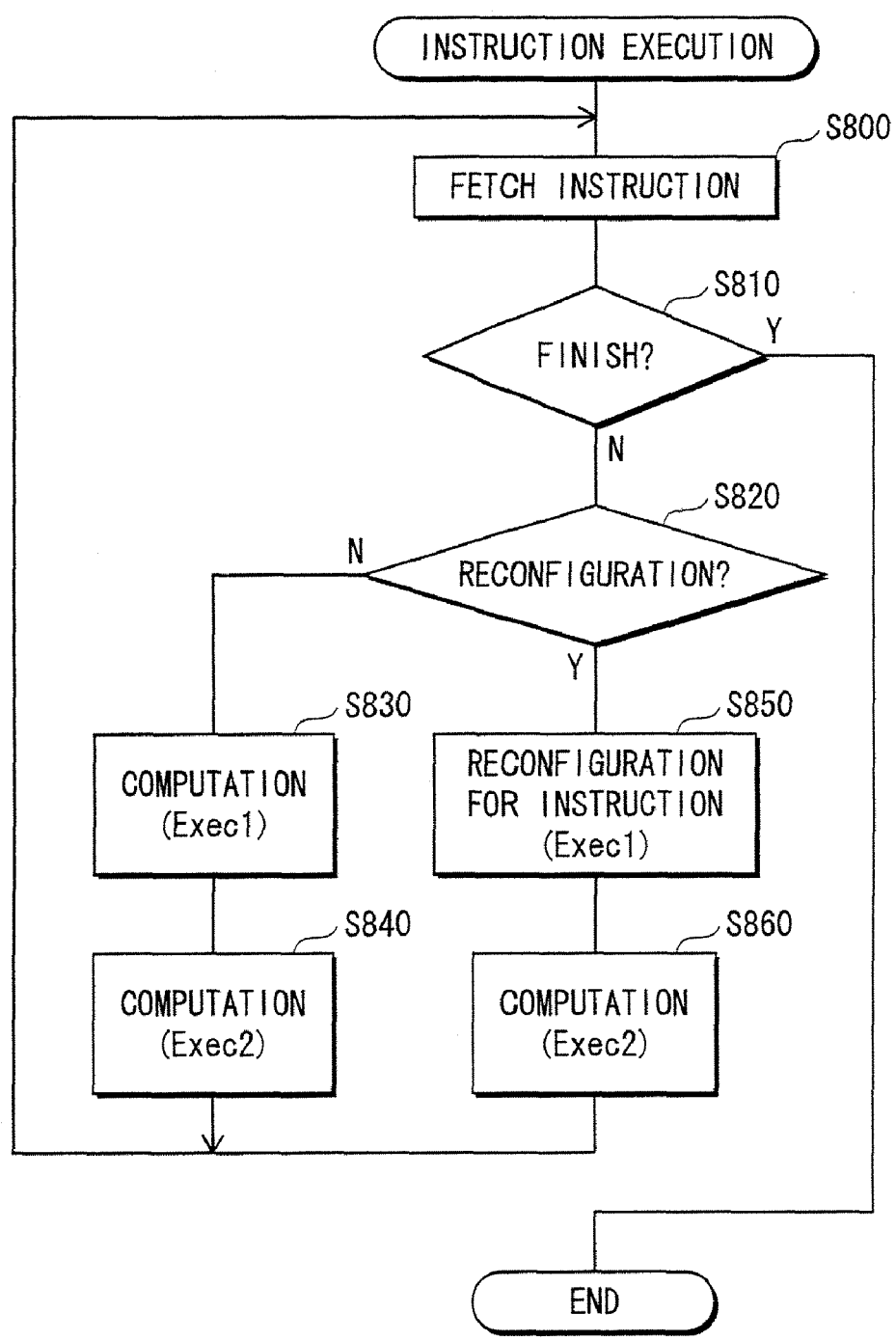
FIG. 10 is a flowchart showing execution of instructions performed by the processor according to the second embodiment.

The following describes how the instructions are executed, with reference to FIG. 8 to FIG. 10.

FIG. 8 is an example program using instruction sets according to the present invention. FIG. 9 is an example of pipeline processing for executing the program.

FIG. 10 is a flowchart showing execution of instructions performed by the processor according to the present invention.

Firstly, the program of FIG. 8 is briefly explained.

The instruction code including "Add" as the operation code 5111 and "r0, r1, r2" as the operand 5112 means an operation of adding values of the register 1 and the register 2 and substituting the result of the addition into the register 0. The instruction code including "Sub" as the operation code 5111 and "r3, r1, r3" as the operand 5112 means an operation of subtracting a value of the register 3 from a value of the register 1, and substituting the result of the subtraction into the register r3.

The instruction code including "Reconf0" as the operation code 5111 and "r2, r0, 0xfe" as the operand 5112 mean an operation of calculating "Reconf0" using a value of the register 0 and an immediate data "0xfe", and substituting the result of the calculation into the register 2. The instruction code including "Reconf1" as the operation code 5111 and "r3, r1, r3" as the operand 5112 mean an operation of calculating "Reconf1" using a value of the register 1 and a value of the register 3, and substituting the result of the calculation into the register 3.

Next, the operations performed by the processor that executes the program are explained with reference to FIG. 9 and FIG. 10. The explanation is made along with the flowchart of FIG. 10, with reference to the time chart of FIG. 9. It is assumed that the program shown in FIG. 8 is stored in the instruction storing unit 5010.

Firstly, the instruction fetch unit 5100 fetches the instruction code "Add r0, r1, r2" (FIG. 10: Step S800, FIG. 9: Step S500), and gives the instruction code to the instruction decoding unit 5200.

Upon receiving the instruction code, the instruction decoding unit 5200 decodes the received instruction code. If the received instruction is a code indicating the processing end (FIG. 10: Step S810: Y), the instruction decoding unit 5200 finishes the processing.

If the instruction code is not a code indicating the processing end (FIG. 10: Step S810: N), the instruction decoding unit 5200 gives the operation code 5111 "Add" to the address table storing unit 5400, and requests the address of the configuration information set.

The address table storing unit 5400 refers to the instruction information table 5410, and judges whether the received operation code 5111 "Add" exists in the operation code type 5411. Since the operation code 5111 "Add" does not exist in the operation code type 5411, the address table storing unit 5400 informs the instruction decoding unit 5200 that the reconfigurable computing unit 5600 is not to be used (FIG. 10: Step S820: N, FIG. 9: Step S510).

The instruction decoding unit 5200, which has informed that the reconfigurable computing unit 5600 is not to be used, gives an instruction generated by decoding the instruction code "Add r0, r1, r2" to the computation control unit 5300.

Upon receiving the result of the decoding, the computation control unit 5300 instructs the fixed-function computing unit 5700 to execute the instruction code "Add r0, r1, r2" (FIG. 10: Step S830, S840).

After fetching the instruction code "Add r0, r1, r2", the instruction fetch unit 5100 fetches the next instruction code "Sub r3, r1, r3" (FIG. 10: Step S800, FIG. 9: Step S520), and gives the instruction code to the instruction decoding unit 5200.

Upon receiving the instruction code, the instruction decoding unit 5200 gives the operation code 5111 "Sub" to the address table storing unit 5400, and requests the address of the configuration information set.

The address table storing unit 5400 refers to the instruction information table 5410, and judges whether the received operation code 5111 "Sub" exists in the operation code type 5411. Since the operation code 5111 "Sub" exists in the operation code type 5411, the address table storing unit 5400 returns the address 5412 "addr1" to the instruction decoding unit 5200 (FIG. 10: Step S820: Y, FIG. 9: Step S600).

Upon receiving the address, the instruction decoding unit 5200 gives the received address 5412 "addr1" to the reconfiguration information storing unit 5500, and transmits the configuration information set at the address to the reconfigurable computing unit 5600 and instructs the reconfigurable computing unit 5600 to perform the reconfiguration.

The instruction decoding unit 5200, which has instructed the reconfigurable computing unit 5600, gives an instruction generated by decoding the instruction code "Sub r3, r1, r3" to the computation control unit 5300.

On the other hand, upon receiving the instruction, the reconfiguration information storing unit 5500 transmits the configuration information set at the received address to the reconfigurable computing unit 5600, to perform reconfiguration (FIG. 10: Step S850, FIG. 9: Step S610).

By this reconfiguration, three areas out of four areas in the reconfigurable computing unit 5600 are reconfigured (See FIG. 7).

Upon receiving the result of the decoding, the computation control unit 5300 instructs the reconfigurable computing unit 5600 to execute the instruction code "Sub r3, r1, r3" (FIG. 10: Step S860, FIG. 9: Step S620).

After that, the result of the execution is written into the register 3 (FIG. 9: Step S630).

In this way, instructions are sequentially executed.

In the case of executing the instruction code "Reconf0 r2, r0, 0xfe" following the instruction code "Sub r3, r1, r3", the operation code "Reconf0" uses the reconfigurable computing unit 5600.

Accordingly, reconfiguration is performed (FIG. 9: Step S700) during the execution of "Sub r3, r1, r3" (FIG. 9: Step S620).

The operation code type 5411 "Reconf0" uses "1" area as indicated by the number of required areas 5413. Therefore, it is possible to perform the reconfiguration while "Sub r3, r1, r3" is being executed using three areas.

This is the same in the case of executing the next instruction code "Reconf1 r3, r1, r3".

As descried above, in a processor including a reconfigurable computing unit, it becomes possible to control the reconfigurable computing unit for each instruction. This realizes flexible and high-performance computing with high area-efficiency.

<Modification>

Next, a modification of the second embodiment is described.

In the second embodiment, the reconfigurable computing unit is reconfigured for each instruction. On the other hand, this modification explains a case where a group of a plurality of instructions is reconfigured at the same time. Since a plurality of instructions is executable in this modification, it is possible to improve the processing speed.

Figure 12:
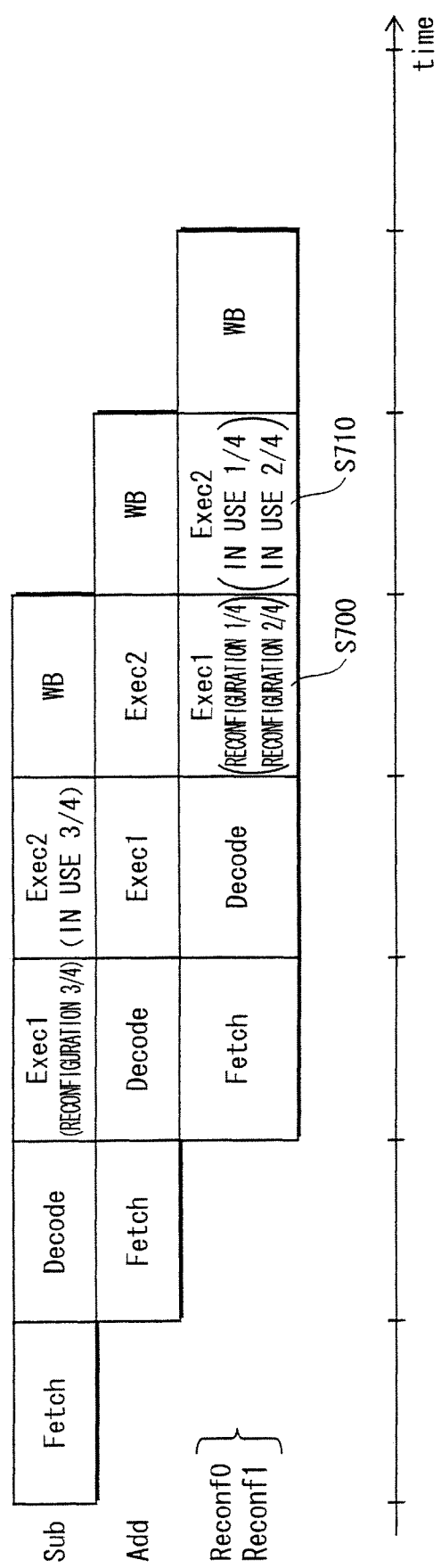
FIG. 12 is an example of pipeline processing for executing a program of a modification.
Figure 13:
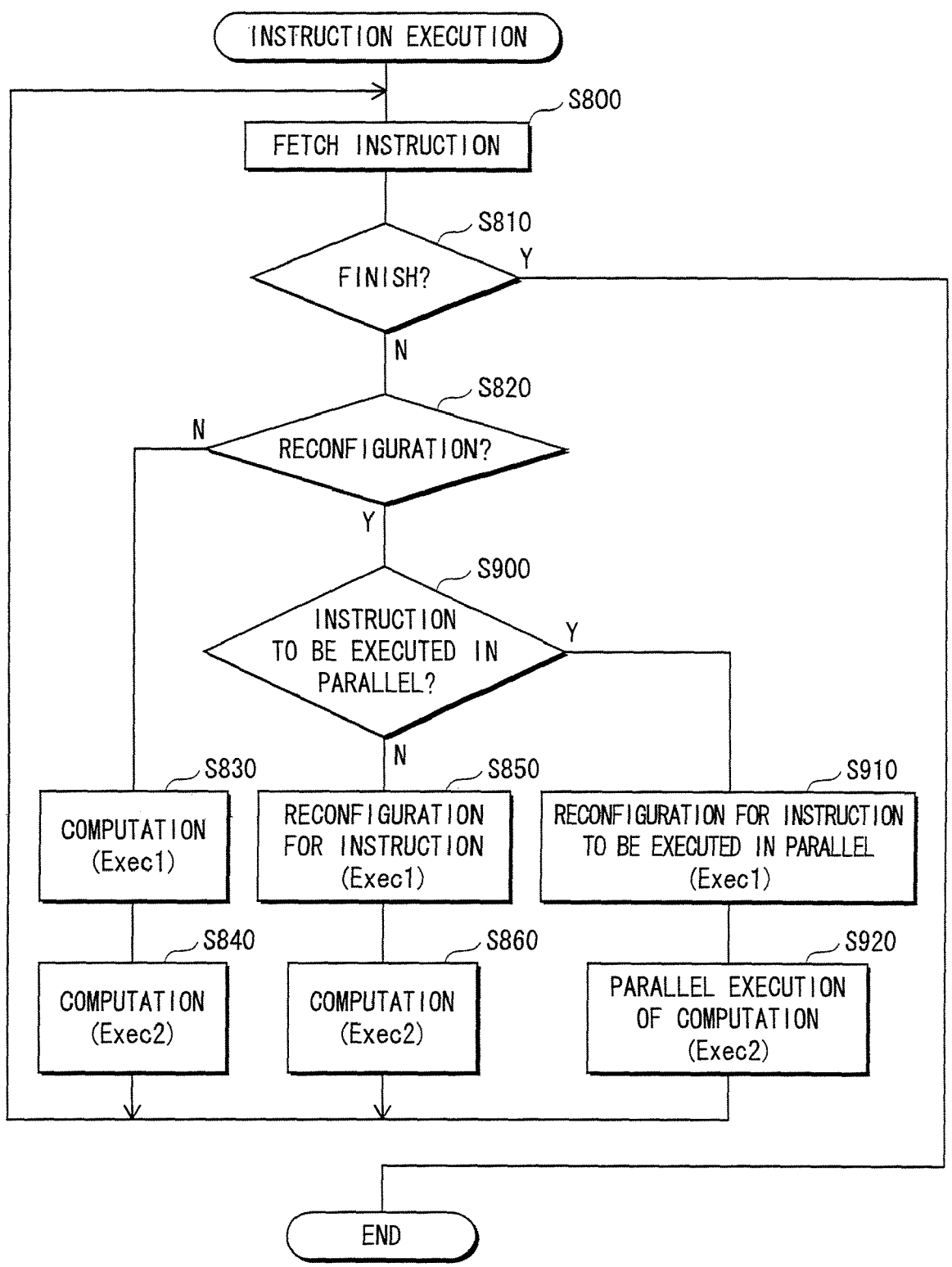
FIG. 13 is a flowchart showing execution of instructions performed by the processor of a modification.

The following describes how the instructions are executed, with reference to FIG. 11 to FIG. 13.

FIG. 11 is an example program using instruction sets of this modification. FIG. 12 is an example of pipeline processing for executing the program.

FIG. 13 is a flowchart showing execution of instructions performed by the processor according to the present invention.

The instructions included in the program of FIG. 11 are the same as those shown in FIG. 8.

The difference is that "Reconf0 r2, r0, 0xfe" and "Reconf1 r3, r1, r3" are executed at the same stage. In FIG. 11, "Reconf0 r2, r0, 0xfe" and "Reconf1 r3, r1, r3" are illustrated to be next to each other so show that they are executed at the same time. However, it is assumed that the compiler has output the instructions such that the instruction decoding unit 5200 interprets that they should be executed at the same time.

For example, with consideration of the number of areas in the reconfigurable computing unit 5600 to be used by the instructions, the order of the instructions and the identification numbers of the areas to be reconfigured are determined at the time of compiling. In other words, instructions that are executable at the same time and reconfigurable at the same time are selected at the time of the compiling with consideration of the execution order of the instructions. The instructions to be executed in parallel and the identification numbers are, for example, written in an operand of an instruction code indicating a parallel execution.

More specifically, the number of required areas 5413 is considered at the time of compiling, and it is judged that "Sub" and "Reconf0" are reconfigurable at the same time but "Sub" and "Reconf1" are not reconfigurable at the same time. This is because "Sub" and "Reconf0" require four areas in total but "Sub" and "Reconf1" require five areas in total (See FIG. 7).

The following briefly explains operations performed by the processor to execute the program, with reference to FIG. 12 and FIG. 13. The explanation is made along with the flowchart of FIG. 13, with reference to the time chart of FIG. 12.

The following describes the flowchart of FIG. 13 focusing only the difference from the flowchart of FIG. 10. Specifically, Step S900 to Step S920 are described next.

The instruction decoding unit 5200, which has interpreted that the "Reconf0 r2, r0, 0xfe" and "Reconf1, r3, r1, r3" use the reconfigurable computing unit and are to be executed at the same time, gives the operation code type 5111 "Reconf0" and the operation code type 5111 "Reconf1" to the address table storing unit 5400, and requests the address of the configuration information set.

The address table storing unit 5400 refers to the instruction information table 5410 and returns the address 5412 "addr4" and the address 5412 "addr5" to the instruction decoding unit 5200 (FIG. 13: Step S820: Y, Step S900: Y).

Upon receiving the addresses, the instruction decoding unit 5200 gives the received addresses 5412 "addr4" and "addr5" to the reconfiguration information storing unit 5500, and instructs the reconfiguration information storing unit 5500 to transmit the configuration information sets at the addresses to the reconfigurable computing unit 5600 to perform reconfiguration.

The instruction decoding unit 5200, which has instructed the reconfigurable computing unit 5600, gives an instruction generated by decoding the instruction codes "Reconf0 r2, r0, 0xfe" and "Reconf1 r3, r1, r3" to the computation control unit 5300.

On the other hand, upon receiving the instruction, the reconfiguration information storing unit 5500 transmits the configuration information sets at the received addresses to the reconfigurable computing unit 5600, to perform reconfiguration (FIG. 13: Step S910, FIG. 12: Step S700).

Upon receiving the result of the decoding, the computation control unit 5300 instructs the reconfigurable computing unit 5600 to execute the instruction codes "Reconf0 r2, r0, 0xfe" and "Reconf1 r3, r1, r3" (FIG. 13: Step S920, FIG. 12: Step S710).

Upon receiving the instruction codes, in the case of not using the reconfigurable computing unit (FIG. 13: Step S820: N) or the case of using the reconfigurable computing unit but only a single instruction is to be executed (FIG. 13: Step S900: N), the instruction decoding unit 5200 performs the same processing as FIG. 10 (FIG. 13: Step S830 to Step S870).

Although the case where two instructions using the reconfigurable computing unit are executed at the same time, the number of instructions executable at the same time is not limited to two. Moreover, it is possible to execute instructions that use the fixed-function computing unit 5700, at the same time.

<Supplemental Explanation>

The processor according to the present invention is described above based on the embodiments. However, it is possible to partially modify the processor, and the present invention is not limited to the above-described embodiments. For example:

(1) Although the operation code of the instruction code and the configuration information set are associated in the second embodiment. However, the present invention is not limited to this.

Figure 14:
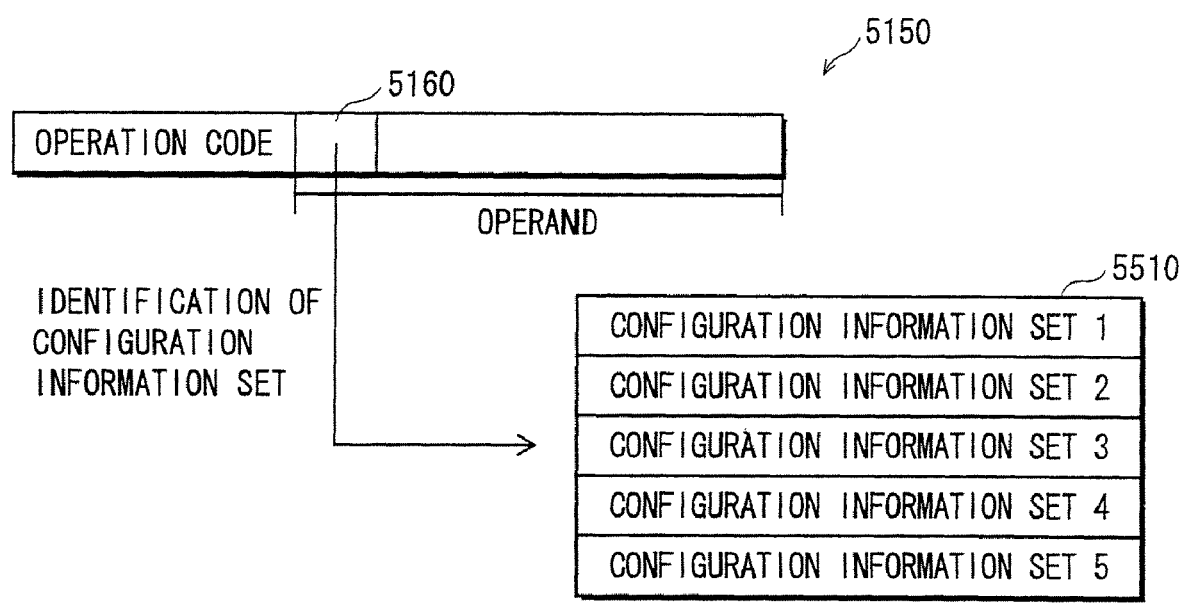
FIG. 14 is a modification of a structure of instructions used in the second embodiment.

For example, a code indicating a configuration information set may be included in the operand. As FIG. 14 shows, an ID of a configuration information set, for example, may be included in a field 5160 of an operand of an instruction code 5150, and the configuration information set may be identified in accordance with the ID at the time of the execution.

(2) In the second embodiment, execution by a plurality of fixed-function computing units is not explained in detail for the sake of simplification. However, a plurality of instructions may be issued at the same time as long as they are executable by the fixed-function computing units and the reconfigurable computing unit at the same time.

It is possible to significantly improve the processing efficiency depending on the way of determining the instructions to be issued at the same time.

A computing unit structured with reconfigurable hardware can selectively perform a plurality of types of computing functions. Accordingly, using the instruction sets according to the present invention, it is possible to create a program with improved instruction parallelism which realizes a suitable function.

The operations for determining the instructions to be issued at the same time may be performed in the processor at the time of instruction interpretation or previously performed at the time of giving the program to the processor.

(3) In the embodiments, it is assumed that the reconfigurable computing unit includes a plurality of homogeneous areas. However, the areas may have different logical blocks, and the sizes thereof may be different from each other.

(4) In the embodiments, it is assumed that the logical block constituting the reconfigurable computing unit is a circuit unit including the look-up table and the flip-flop. However, the logical block may be a combination of general logical circuits, such as an ALU (Arithmetic and Logical Unit), a unit that performs shifting, data control and logical computation and a flip-flop,

INDUSTRIAL APPLICABILITY

A processor according to the present invention can reduce the circuit size and realize flexible and high-performance processing. Therefore, the processor according to the present invention is particularly useful as a computing unit for an image processing LSI and so on.

The invention claimed is:

1. A processor that cyclically executes a plurality of threads in accordance with an execution time allocated to each of the threads, comprising:
   a reconfigurable integrated circuit;
   a reconfiguration unit operable to reconfigure a part of the reconfigurable integrated circuit based on a circuit configuration information set;
   a configuration information storing unit that stores therein circuit configuration information sets corresponding one-to-one to the threads;
   a control unit operable to put each thread into execution using the reconfigurable integrated circuit that has been reconfigured based on one of the configuration information sets that corresponds to the thread; and
   a selection unit operable, while a given thread put into execution by the control unit is being executed, to select a thread to be executed next, based on an amount of an area in the reconfigurable integrated circuit other than an area used by the given thread and an amount of an area in the reconfigurable integrated circuit required for reconfiguring the reconfigurable integrated circuit based on the circuit configuration information sets, wherein
   while the given thread is being executed, the control unit has the reconfiguration unit reconfigure the reconfigurable integrated circuit in part using an area that is not currently used for execution of the given thread, based on the circuit configuration information set corresponding to the thread selected by the selection unit.

2. The processor of claim 1 further comprising:
   a computing unit, wherein the control unit puts the given thread into execution using the computing unit and the reconfigurable integrated circuit that has been reconfigured.

3. A processor that executes a program including a plurality of instructions, comprising:
   a reconfigurable integrated circuit;
   a reconfiguration unit operable to reconfigure a part of the reconfigurable integrated circuit based on a circuit configuration information set;
   a configuration information storing unit that stores therein circuit configuration information sets corresponding one-to-one to the instructions;
   a selection unit operable to select two or more instructions for all of which the reconfigurable integrated circuit is reconfigurable at the same time based on the circuit configuration information sets; and
   an execution unit operable to execute the two or more instructions in parallel using the reconfigurable integrated circuit that has been reconfigured based on configuration information sets respectively corresponding to the two or more instructions, wherein while the given instructions are being executed, the execution unit has the reconfiguration unit reconfigure the reconfigurable integrated circuit in part using an area where it is not currently used for execution of the two of more instructions, based on the circuit configuration information set corresponding to the instruction selected in the selection unit.

4. A thread execution method used by a processor that includes a reconfigurable integrated circuit and cyclically executes a plurality of threads in accordance with an execution time allocated to each of the threads, comprising:
   a reconfiguration step of reconfiguring a part of the reconfigurable integrated circuit based on a circuit configuration information set;
   a configuration information storing step of storing, in a memory, circuit configuration information sets corresponding one-to-one to the threads;
   a control step of putting each thread into execution using the reconfigurable integrated circuit that has been reconfigured based on one of the configuration information sets that corresponds to the thread; and
   a selection step of selecting, while a given thread put into execution in the control step is being executed, a thread to be executed next, based on an amount of an area in the reconfigurable integrated circuit other than an area used by the given thread an amount of an area in the reconfigurable integrated circuit required for reconfiguring the reconfigurable integrated circuit based on the circuit configuration information sets, wherein while the given thread is being executed, the control step has the reconfiguration step reconfigure the reconfigurable integrated circuit in part using an area where it is not currently used for execution of the given thread, based on the circuit configuration information set corresponding to the thread selected at the selection step.

5. A processor comprising:
an instruction fetch unit operable to fetch an instruction code including an operation code and an operand from an instruction storage;
an instruction decode unit operable to decode the instruction code;
an instruction execution unit including a reconfigurable computing device;
a control unit operable to control the instruction execution unit according to a result of decoding by the instruction decode unit; and
a configuration information storing unit storing, for each of a plurality of operation codes, a circuit configuration information set used for configuration of a circuit required for execution of processing indicated by the operation code, the plurality of operation codes classified according to operand types thereof, wherein
the instruction decode unit gives the reconfigurable computing device an instruction to perform reconfiguration of the reconfigurable computing device according to a result of decoding by the instruction decode unit,
the reconfigurable computing device performs the reconfiguration according to the instruction by using a circuit configuration information set corresponding to an operation code obtained through the decoding by the instruction decode unit, and
the control unit issues an instruction code decoded by the instruction decode unit to the reconfigurable computing device that has completed the reconfiguration, thereby controlling the instruction execution unit to execute, on data indicated by an operand included in the instruction code, processing indicated by the operation code, wherein while the given operation code is being executed, a selection unit selects an operation code to be executed next, based on an amount of an area in the circuit other than an area being used by the given operation code and an amount of an area in the circuit required for reconfiguring the circuit based on the circuit configuration information sets, and the control unit has the reconfigurable computing device reconfigure the circuit in part using an area that is not currently used for execution of processing indicated by the operation code, based on the circuit configuration information set corresponding to operation code selected in the selection unit.

6. The processor of claim 5, wherein
the instruction decode unit selects two or more instruction codes that are available at the same time for reconfiguration of the reconfigurable computing device, based on the circuit configuration information sets,
the reconfigurable computing device performs the reconfiguration by using circuit configuration information sets corresponding to the two or more instruction codes, and
the control unit controls the instruction execution unit to execute the two or more instruction codes by using two or more circuits that have been reconfigured.

7. The processor of claim 5, wherein
the instruction execution unit further includes a fixed-function computing device, and
when no circuit configuration information set in the configuration information storing unit corresponds to an operation code obtained through decoding of an instruction code by the instruction decode unit, the control unit controls the instruction execution unit to execute the instruction code by using the fixed-function computing device.

8. The processor of claim 5, wherein
each operand includes a code associating a operation code with a circuit configuration information set.

\* \* \* \* \*